United States Patent
Risch et al.

(10) Patent No.: US 8,061,749 B2
(45) Date of Patent: Nov. 22, 2011

(54) FOOD SERVING UTENSIL

(75) Inventors: Thomas M. Risch, Westport, CT (US); Jack Elder, Oakland Township, MI (US)

(73) Assignee: Liquid Motion, Inc., Bethel, CT (US)

( * ) Notice: Subject to any disclaimer, the term of this patent is extended or adjusted under 35 U.S.C. 154(b) by 459 days.

(21) Appl. No.: 12/144,721

(22) Filed: Jun. 24, 2008

(65) Prior Publication Data
US 2009/0001739 A1    Jan. 1, 2009

Related U.S. Application Data

(60) Provisional application No. 60/946,234, filed on Jun. 26, 2007.

(51) Int. Cl.
*B25B 7/00* (2006.01)
(52) U.S. Cl. .......................... 294/99.2; 294/16
(58) Field of Classification Search ............... 294/3, 16, 294/99.2
See application file for complete search history.

(56) References Cited

U.S. PATENT DOCUMENTS

| | | |
|---|---|---|
| 567,087 A | 9/1896 | Fitzgerald et al. |
| 941,798 A | 11/1909 | Moore |
| 1,333,941 A | 3/1920 | Silver |
| D85,796 S | 12/1931 | Wells |
| 2,244,075 A | 6/1941 | Ledbetter |
| D141,461 S | 6/1945 | Wyszynski |
| 2,444,116 A | 6/1948 | Rossi |
| 2,881,022 A | 4/1959 | Brust |
| 3,181,198 A | 5/1965 | Stelzen |
| 3,975,043 A | 8/1976 | Miles |
| 4,148,510 A | 4/1979 | Brack et al. |
| 4,682,803 A | 7/1987 | Andrews |
| 4,768,288 A | 9/1988 | Culbertson |
| 5,199,756 A * | 4/1993 | Bartlett et al. ............. 294/16 |
| 5,830,305 A | 11/1998 | Andersen et al. |
| 6,056,338 A * | 5/2000 | Kerr ............. 294/16 |
| 6,092,847 A * | 7/2000 | Kwan ............. 294/16 |
| 6,237,294 B1 | 5/2001 | Rygiel |
| 6,460,433 B1 | 10/2002 | Ackeret et al. |
| 6,568,728 B1 * | 5/2003 | Wang ............. 294/16 |
| 6,702,141 B1 | 3/2004 | Cinque |
| 6,726,263 B2 | 4/2004 | Wang et al. |

(Continued)

FOREIGN PATENT DOCUMENTS
WO    WO 00/30508    6/2000

*Primary Examiner* — Saul Rodriguez
*Assistant Examiner* — Stephen Vu
(74) *Attorney, Agent, or Firm* — Maginot, Moore & Beck

(57) ABSTRACT

A food serving utensil is provided for grasping food. The utensil includes two concave, bowl-shaped members oriented relative to each other to define a cavity. The bowl-shaped members are rotatably coupled at a hinge to allow opening and closing of the cavity using a single hand. The hinge is preferably made of a resilient material and extends over the bowl-shaped members to provide a gripping surface for operation. A lock is provided to lock the bowl-shaped members in a partially closed position. The locked position enables the food serving utensil to be easily stored in limited spaces such as a kitchen drawer. The lock is also preferably designed such that utensil will not open inadvertently while stored. The lock is released by pushing the bowl-shaped members toward each other, preferably in a specific location on the bow-shaped members. A method for making the utensil is provided.

25 Claims, 14 Drawing Sheets

U.S. PATENT DOCUMENTS

| | | | |
|---|---|---|---|
| 6,869,117 B1 * | 3/2005 | Blum | 294/16 |
| 7,044,057 B2 | 5/2006 | Parker et al. | |
| 7,086,676 B2 * | 8/2006 | Sumter et al. | 294/16 |
| 2005/0183579 A1 | 8/2005 | Bowers | |
| 2005/0236853 A1 | 10/2005 | Demetroulakos et al. | |

* cited by examiner

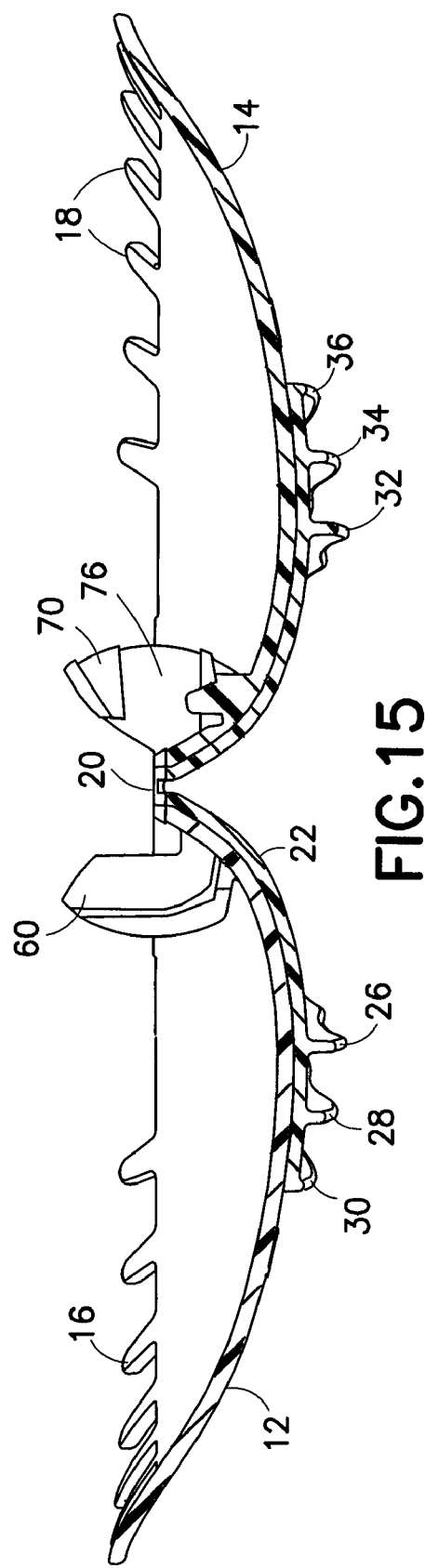

FOOD SERVING UTENSIL

RELATED APPLICATION

This application claims benefit from U.S. Ser. No. 60/946,234, filed Jun. 26, 2007, which is hereby incorporated by reference herein in its entirety.

BACKGROUND OF THE INVENTION

1. Field of the Invention

This invention relates to food serving utensils. In particular, this invention relates to an easily storable hand-held serving utensil that can be used to grasp foods such as salad or pasta.

2. State of the Art

Utensils are often used to assist the gathering and movement of difficult to grasp foods such as salad or pasta from a serving dish to a plate. Examples include salad serving utensils and tongs. Salad utensils typically include an elongated fork and a separate elongated spoon which are used in conjunction with each other. Salad utensils generally require the use of two hands to operate except when they are formed as salad tongs.

Tongs are another example of a food grasping utensil and are typically made of a metal or plastic material and contain two elongated arms. Unlike standard salad utensils, the elongated members of tongs are generally joined at a hinge for single-handed operation. The two elongated arms may be opened and then closed about the food to grasp a quantity of food. The tongs may also include end structures to assist in the grasping of the food such as prongs, forks, or spoons.

When stored, the elongated arms of the tongs may occupy a significant amount of kitchen drawer space. Furthermore, the elongated members of the tongs may spread apart as the kitchen drawer is opened and closed to remove and insert other kitchen utensils placed therein.

Typically, the elongated arms of the tongs end at a hinged joint and may be biased to an open position that requires the user to close the tongs against the bias to collapse about food for collection. Tongs biased in this manner often include a lock to maintain the tongs in a closed position for ease of storage. Examples of locks in the prior art include clasps and clips. Furthermore, while tongs having extended arms are functionally suitable to move food, these types of tongs provide limited space for food grasping, particularly large servings of a food item.

Those of ordinary skill in the art of utensil design will appreciate that because both tongs and salad utensils require the maneuvering of food grasping members distanced from the user's hands on respective elongated members, these instruments may be somewhat awkward to use. It will be apparent to one of ordinary skill in the art the desirability of having a food serving utensil in which the user's hand is more directly in control of the grasping function and also in which larger quantities of food can be grasped than with prior art utensils.

SUMMARY OF THE INVENTION

It is therefore an object of the invention to provide a food serving utensil that is operable with a single hand that can be used to grasp food for serving.

It is another object of the invention to provide a food serving utensil that is wider than it is long for ease of placement in a single hand.

It is an additional object of the invention to provide a food serving utensil that has an aesthetically pleasing shape.

It is a further object of the invention to provide a food serving utensil having a lock to enable the device to be compactly stored that is integral to the utensil and does not interfere with its normal operation when disengaged.

In accord with these objects, which will be discussed in detail below, a food serving utensil according to the invention is provided for grasping food. The utensil includes two bowl-shaped members each having a concave surface facing the other and oriented relative to each other to define a cavity therebetween when in a closed position. The bowl-shaped members are coupled at a hinge, preferably biased apart with a spring. The bowl-shaped members can rotate about the hinge relative to each other between open and closed positions. A lock is provided to lock the bowl-shaped members in a partially closed position. The lock can be released by forcing the bowl-shaped members toward each other.

In one embodiment, the bowl-shaped members are each sized for being held within the palm of a human hand. The bowl-shaped members are preferably wider than they are long for ease of placement in the hand. Each bowl-shaped member may have a plurality of tines extending from an edge opposite the hinge to facilitate the grasping of food items.

The hinge is preferably a live hinge constructed of a more flexible material than the bowl-shaped members. The material forming the hinge preferably extends into a gripping surface that covers a rear portion of each bowl-shaped member. The gripping surface preferably includes a plurality of gripping ridges to assist a hand in the gripping and operation of the utensil.

The lock is provided to restrict rotation of the two bowl-shaped members about the hinge. In one embodiment, the lock is preferably comprised of a sliding latch having a button which extends through the hinge and a set of arms extended from the bowl-shaped members within the cavity near the hinge. The arms of the lock engage each other so as to restrict rotation of the bowl-shaped members about the hinge to a small angle. Activation of the lock is achieved by pressing the button when the bowl-shaped members are in a substantially closed position. The substantially closed and locked position enables the food serving utensil to be easily stored in limited spaces such as a kitchen drawer. Pressing the bowl-shaped members toward each other when in the locked position causes the lock to release. The lock is designed so that the food serving utensil can be locked and unlocked by a single hand without additional assistance.

The food serving utensil of the present invention is preferably substantially formed in two injection molding steps. A first injection molding step forms the bowl-shaped members using a first thermoformable material including portions (e.g. arms) of the lock. Then, without removing the bowl-shaped members from the injection mold, a second injection molding step injects a second thermoformable material over the two bowl-shaped members to form the live hinge and gripping surfaces. The device as formed is then removed and a sliding latch and a spring are inserted to complete assembly of the utensil.

Additional objects and advantages of the invention will become apparent to those skilled in the art upon reference to the detail description taken in conjunction with the provided figures.

BRIEF DESCRIPTION OF THE DRAWINGS

FIG. 15 is a side cross-sectional view of the assembled molded components of FIG. 14.

DETAILED DESCRIPTION OF THE PREFERRED EMBODIMENTS

Figure 1:
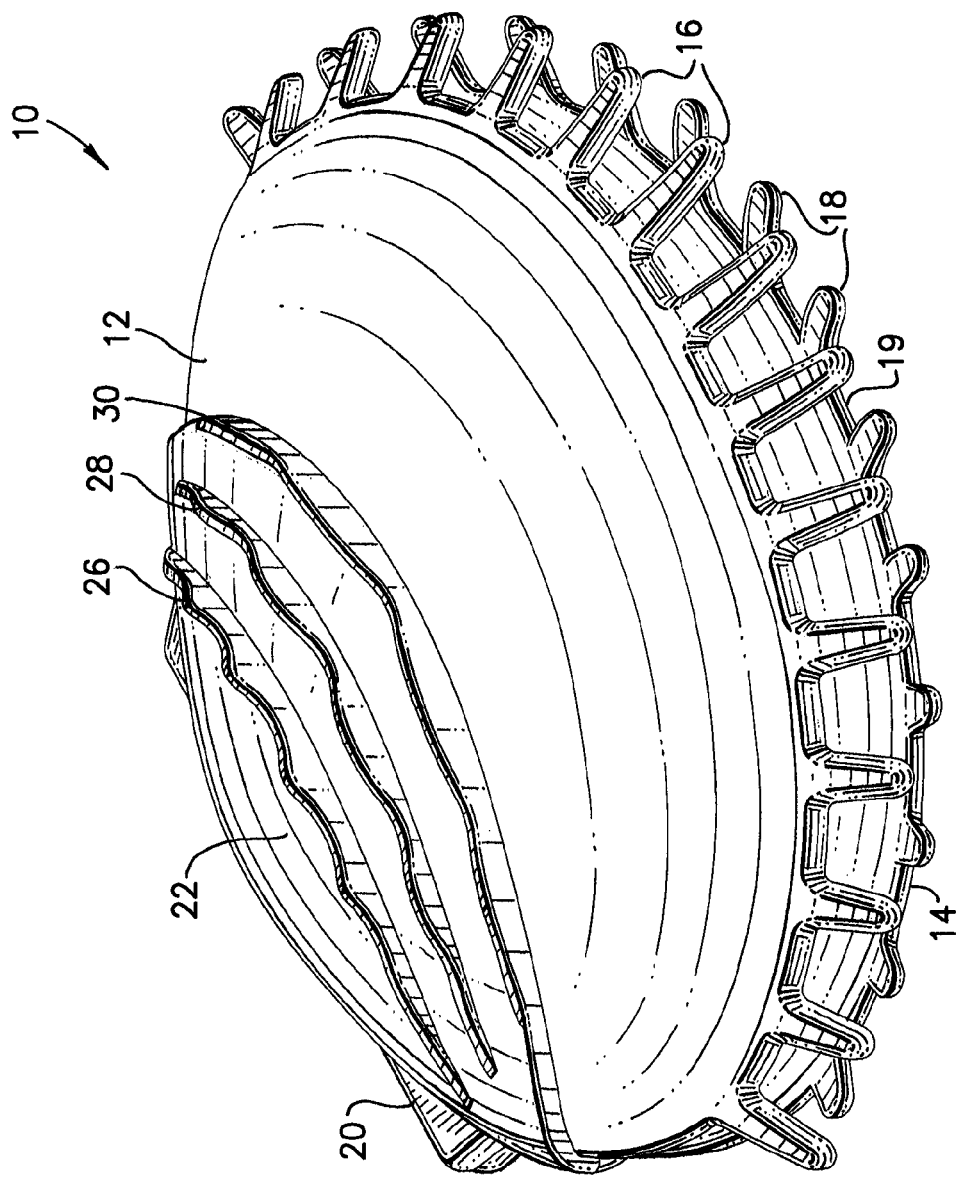
FIG. 1 is a perspective view of the food serving utensil in a locked position.

Turning now to FIGS. 1-6, a food serving utensil 10 is shown having a first bowl-shaped member 12 and a second bowl-shaped member 14 molded to resemble a shell. The bowl-shaped members 12, 14 are joined by a hinge 20 at the rear of the utensil 10 and are biased to an open position by a spring 40 (shown in FIG. 7). The hinge 20 permits opening and closing of the bowl-shaped members 12, 14 about an axis defined by the hinge 20. The food serving utensil 10 also includes a lock 50 for restricting the opening of the food serving utensil 10. The lock 50 is shown and described in more detail with respect to FIGS. 7-11B below.

Figure 2:
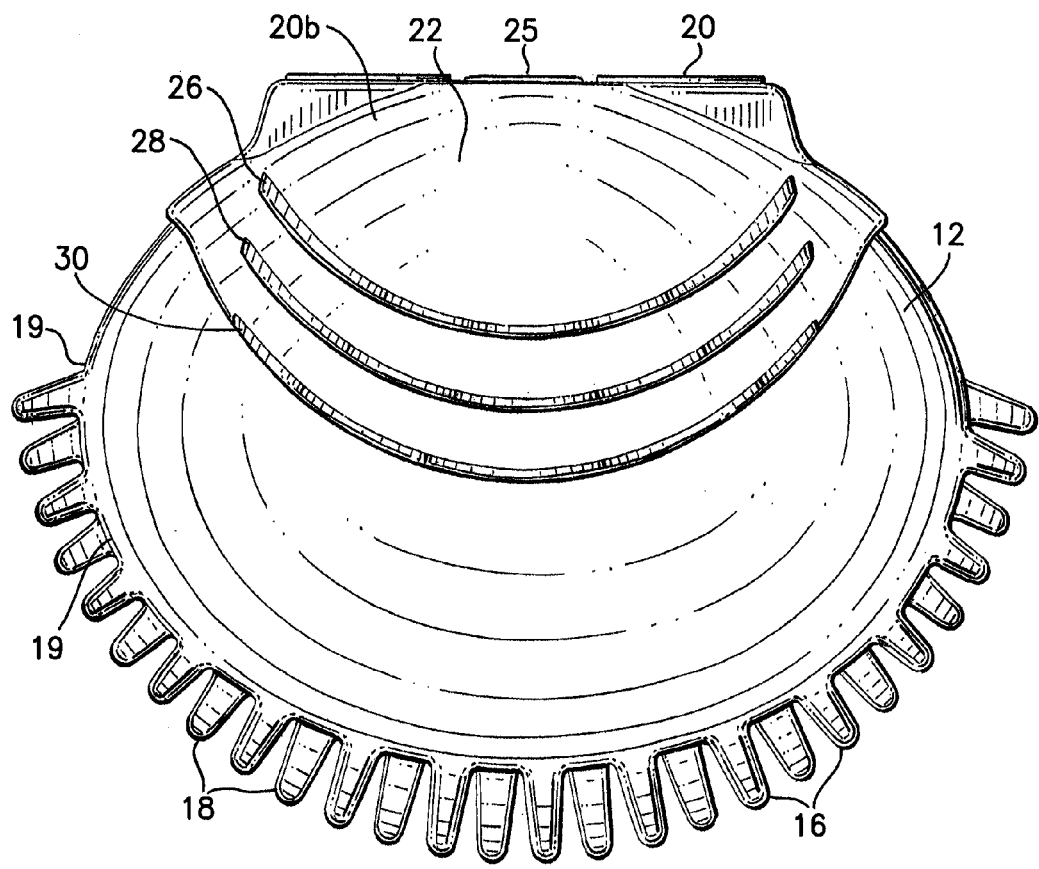
FIG. 2 is a top view of the food serving utensil in a locked position.
Figure 3:
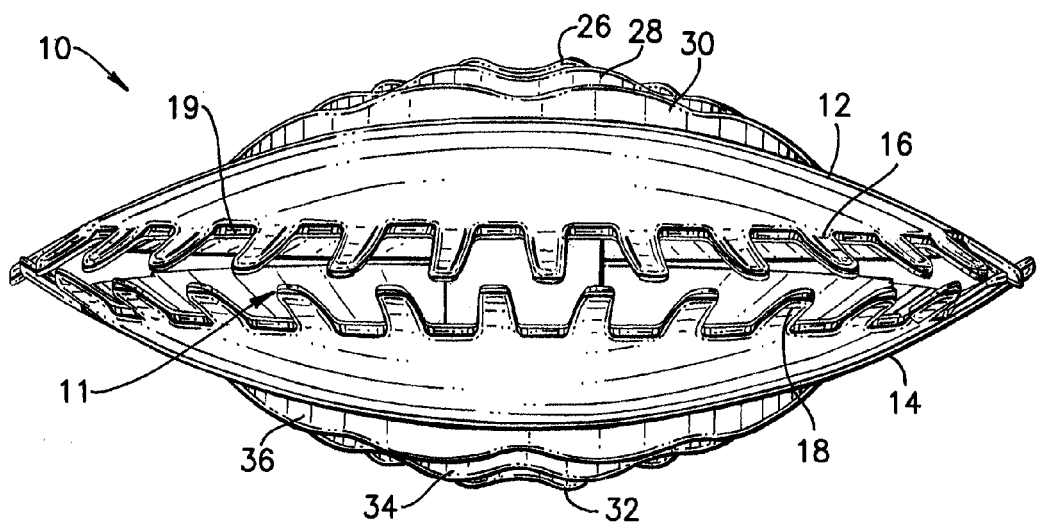
FIG. 3 is a front view of the food serving utensil in the locked position.

The bowl-shaped members 12, 14 are thermoformed to create concavely-shaped hardened shells. These bowl-shaped members 12, 14 are preferably formed wider than long, i.e. the maximum dimension parallel to the axis of the hinge is greater than the transverse maximum dimension. This length to width ratio is best seen in FIG. 2 where the defined width (W) dimension is shown perpendicular to the length (L) dimension. The width provides support for the food serving utensil 10 so that it fits snugly in the palm of a single human hand for ease of operation. In one embodiment, the bowl-shaped members 12, 14 are about 14 cm wide and extend about 11 cm in length. When used, the length of the food serving utensil 10 extends outward from the palm for grasping food.

Figure 6:
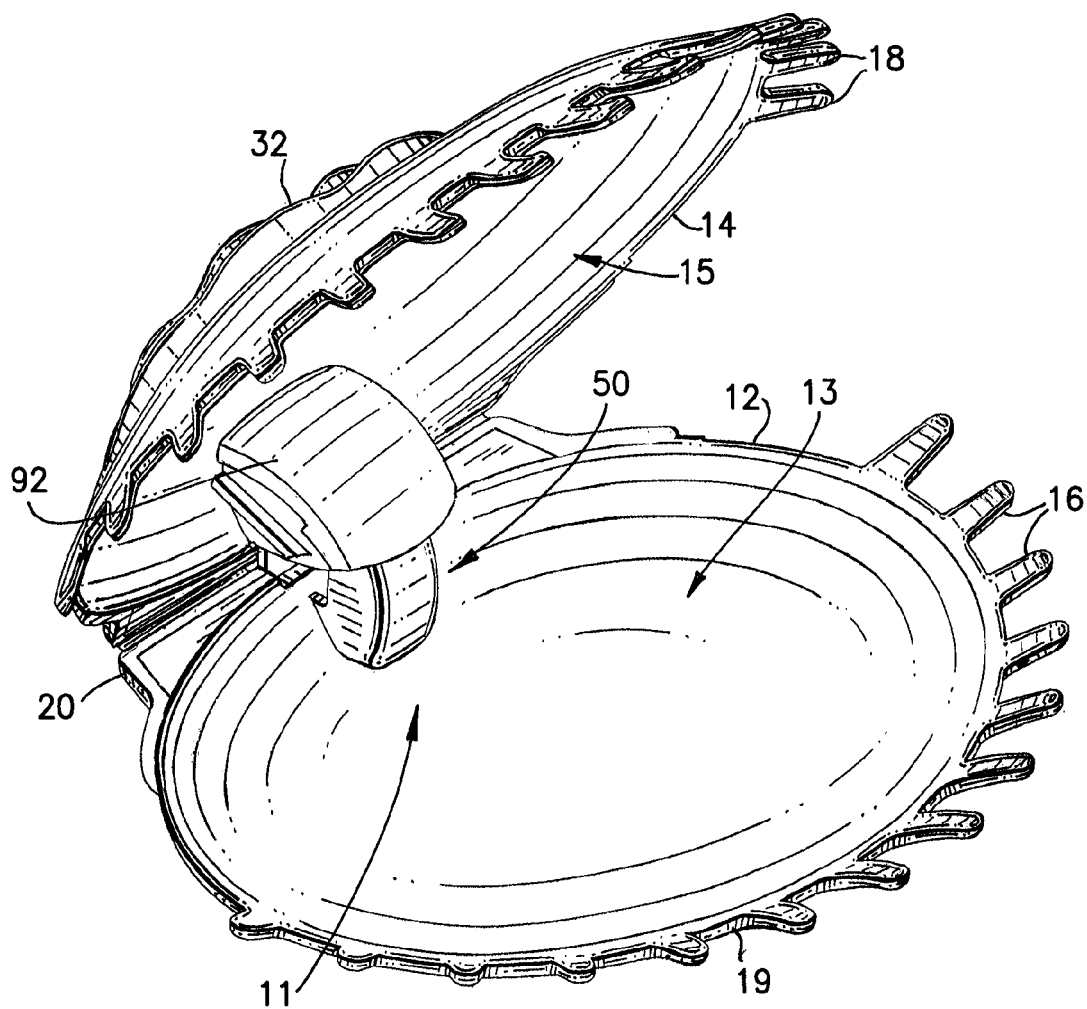
FIG. 6 is a perspective view of the food serving utensil in an open position.

The bowl-shaped members 12, 14 are also preferably shaped to an aesthetically pleasing form. In the preferred embodiment, the bowl-shaped members 12, 14 are shell-shaped each defining a cavity 13, 15 within. When the bowl-shaped members 12, 14 are joined to form the food serving utensil 10, the members 12, 14 are placed together such that the cavities 13, 15 form a large open space 11 therebetween as seen in FIG. 6 which may be filled with food. This open space 11 provides an additional functionality not available with standard tong-like kitchen utensils. When the food serving utensil 10 is used to grasp food, the open space 11 provides a large storage and food transfer capacity. In distinction from tongs, the utensil permits delivery of food items in greater quantities with fewer repetitions between the food source and destination. Also, the utensil is more stable than prior art tongs when grasping food as a result of the placement of the hand closer to the food.

Figure 12:
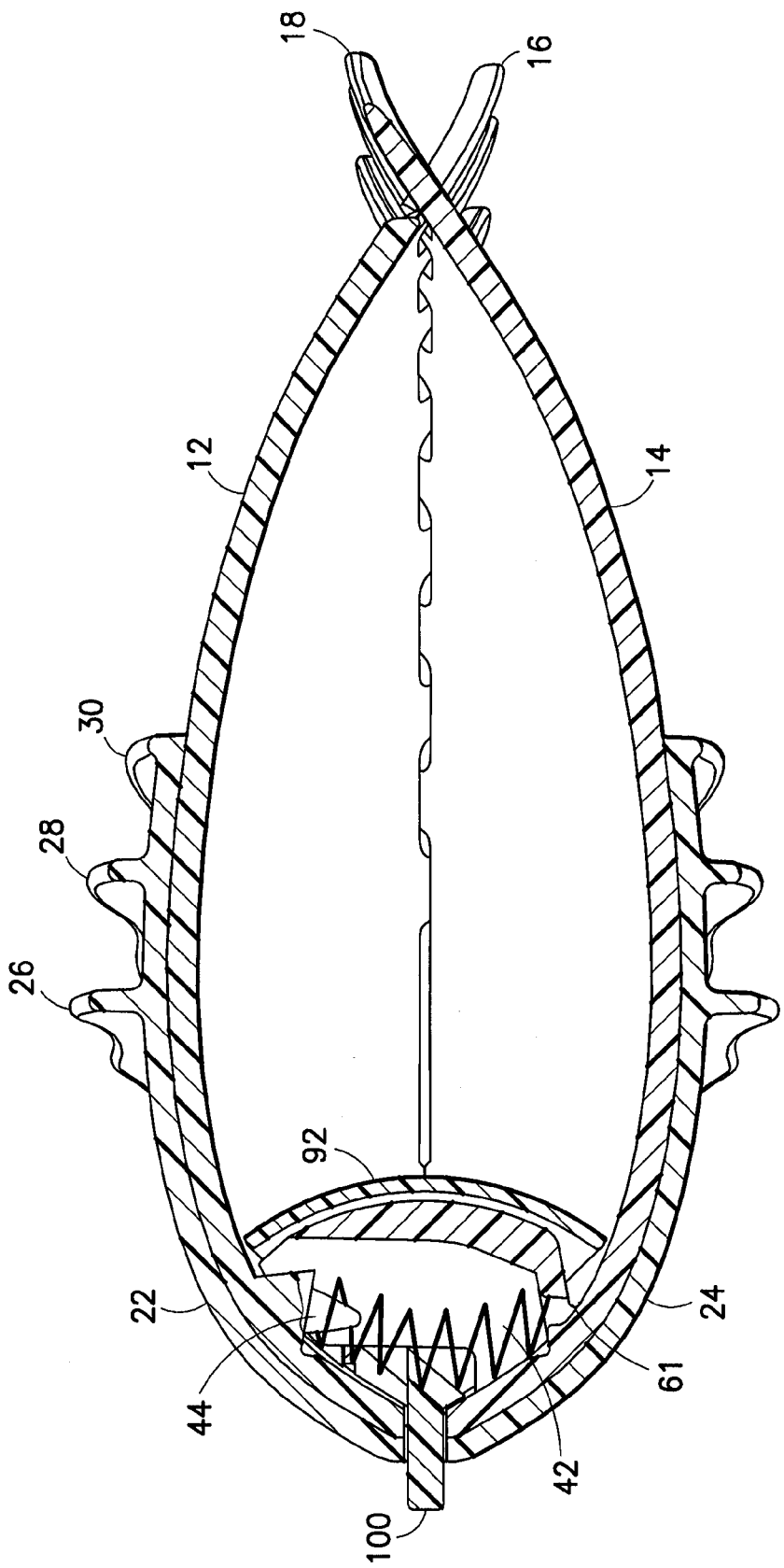
FIG. 12 is a side cross-sectional view of the food serving utensil in a closed position.
Figure 13:
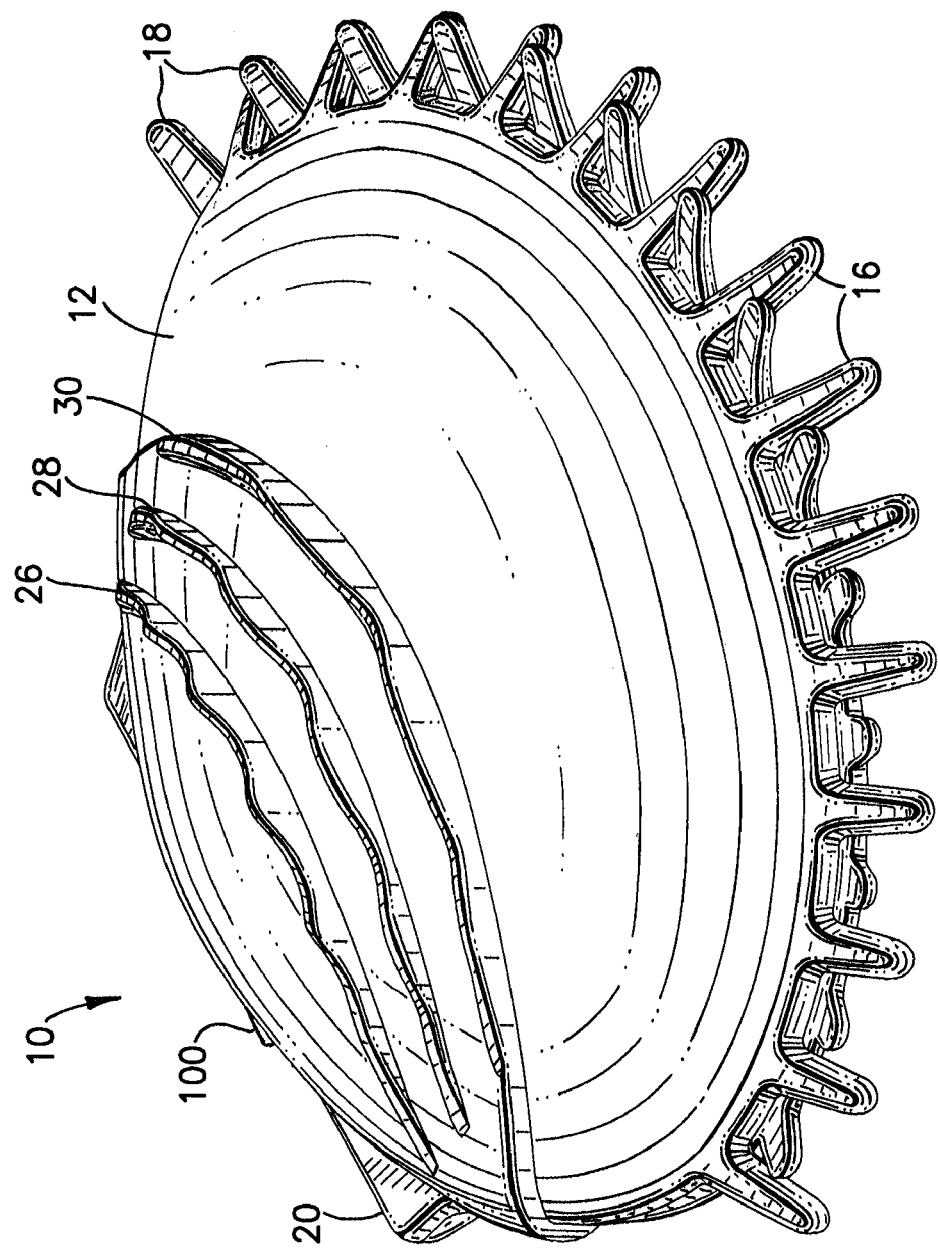
FIG. 13 is a perspective view of the food serving utensil in a closed position.

The bowl-shaped members 12, 14 each have a plurality of tines 16, 18 that extend outwardly from an edge 19 of each member 12, 14. The tines are preferably thermoformed simultaneously with the bowl-shaped members 12, 14 and are preferably formed of the same polymeric material. In one embodiment, the tines 16, 18 are preferably about 5 mm in width and extend about 1 cm in length from the edge 19 of each bowl-shaped member 12, 14. The tines 16, 18 assist in the grasping of food items. The bowl-shaped members 12, 14 can be opened and then closed about difficult to grasp food items so that the tines 16, 18 capture food items for ease of placement. The tines 16, 18 are also offset from each other and are effectively interlaced when brought into a closed position as best seen in FIGS. 12 and 13. This offset configuration allows the bowl-shaped members 12, 14 to rest atop each other in the closed position such that the tines 16 and the tines 18 do not stack atop each other allowing the edges 19 of the bowl-shaped members 12, 14 to meet when in the closed position. Without this offset feature, the tines 16, 18 would meet at their tips and prevent edges 19 of the bowl-shaped members 12, 14 from meeting when rotated into the closed position about the hinge 20.

Figure 4:
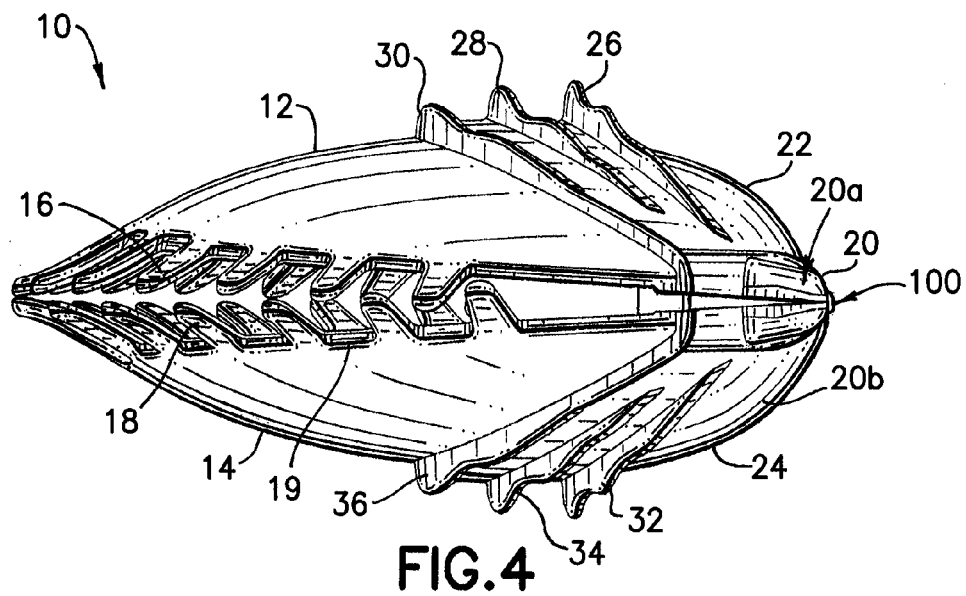
FIG. 4 is side view of the food serving utensil in a locked position.
Figure 5:
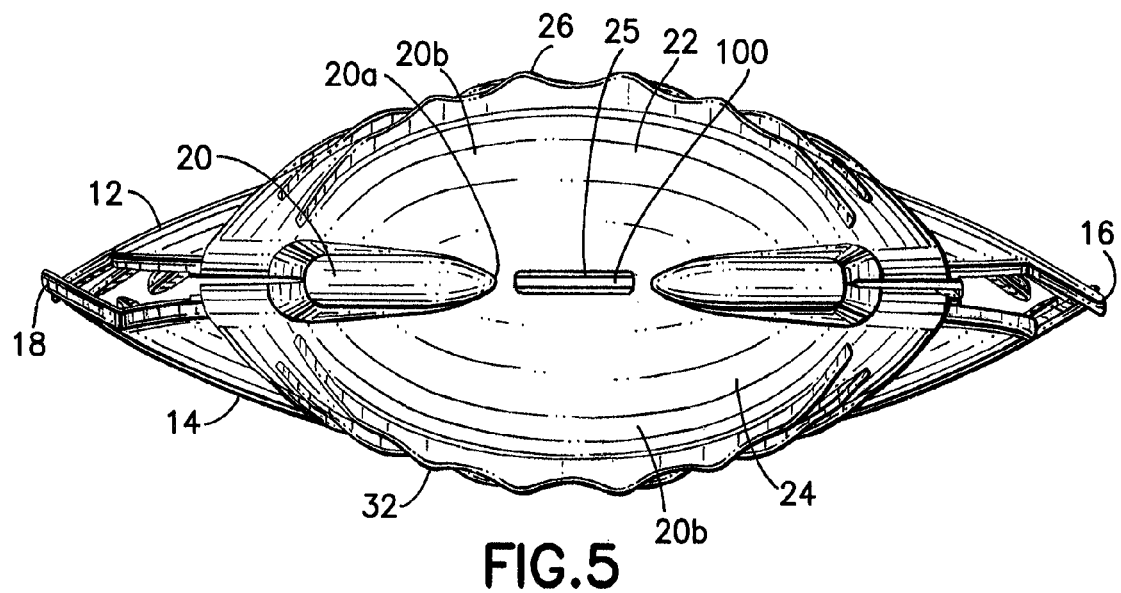
FIG. 5 is a rear view of the food serving utensil in a locked position.

The hinge 20 is preferably thermoformed of a softer material than the bowl-shaped members 12, 14. The hinge 20 provides two aspects to the operation of the food serving utensil 10. First, the hinge 20 forms a live hinge 20a defining an axis about which the bowl shaped members 12, 14 can rotate as seen in FIGS. 4 and 5. A slot-like opening 25 is defined in the live hinge 20a for receiving a portion of a latch of the lock 50 as described hereinafter. Second, extended portions 20b of the hinge 20 may be optionally provided to create an upper grip 22 over a portion of the outer surface of the bowl-shaped member 12 and a lower grip 24 over a portion of the outer surface the bowl-shaped member 14 as seen in FIGS. 1-4. The grips 22, 24 are designed to provide the hand of a user of the food serving utensil 10 a surface that is easier to hold onto than the smooth, hardened surfaces of the bowl-shaped members 12, 14.

The upper and lower grips 22, 24 preferably include a plurality of gripping ridges 26, 28, 30, 32, 34, 36 to assist the user of the food serving utensil 10 in holding and closing the device. Each gripping ridge is simultaneously thermoformed with the hinge 20 and made from the same polymeric material as the hinge 20. In addition, each ridge 26, 28, 30, 32, 34, 36 may be shaped to provide a decorative aspect to the food serving utensil 10. In a preferred embodiment, the gripping ridges 26, 28, 30, 32, 34, 36 are formed with multiple curved indentations that resemble waves. The gripping ridges 26, 28, 30, 32, 34, 36 could also be thermoformed to define openings or grooves for evenly spaced placement of fingers therebetween.

Figure 7:
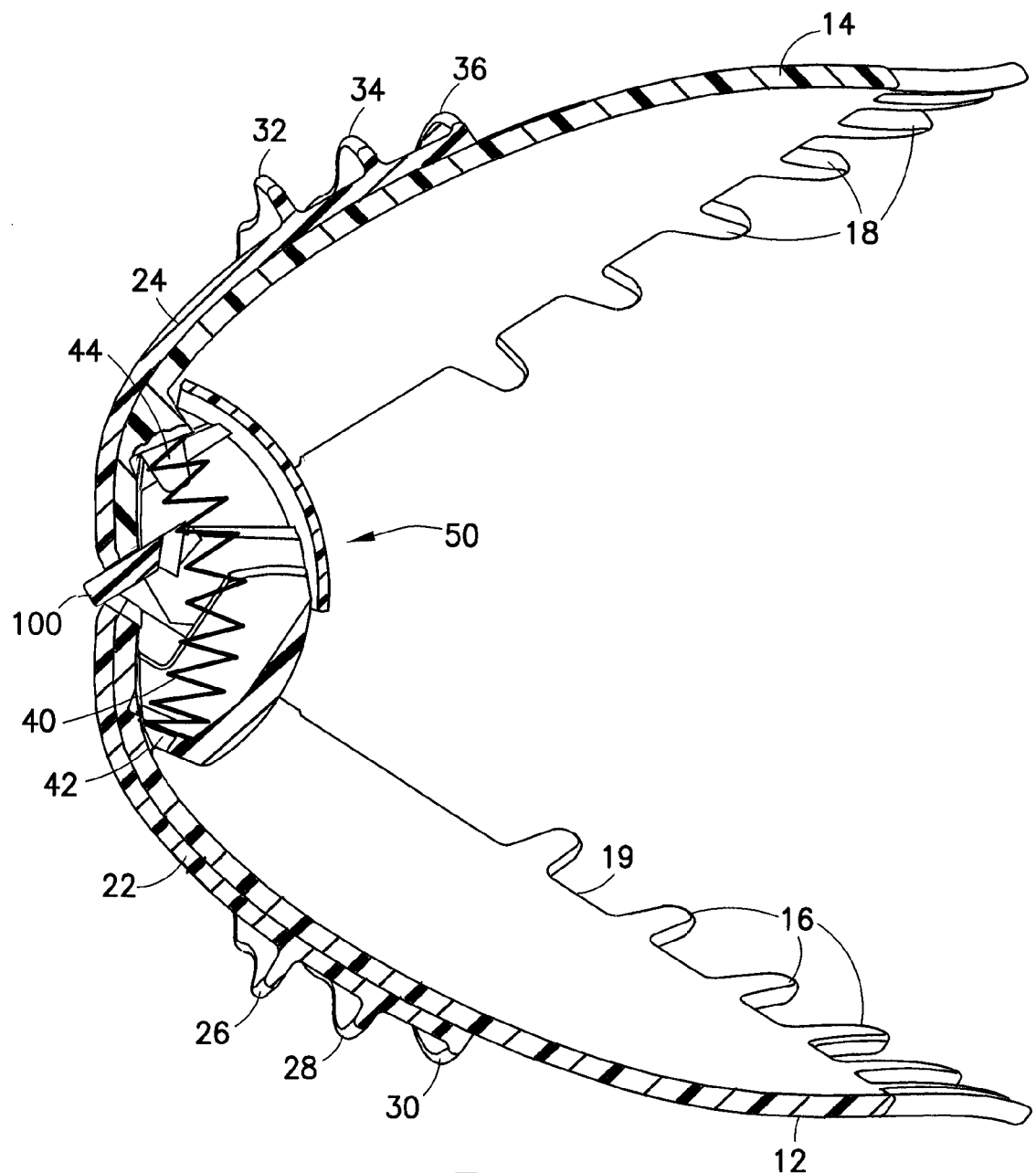
FIG. 7 is a cross-sectional view of the food serving utensil in the open position.
Figure 8:
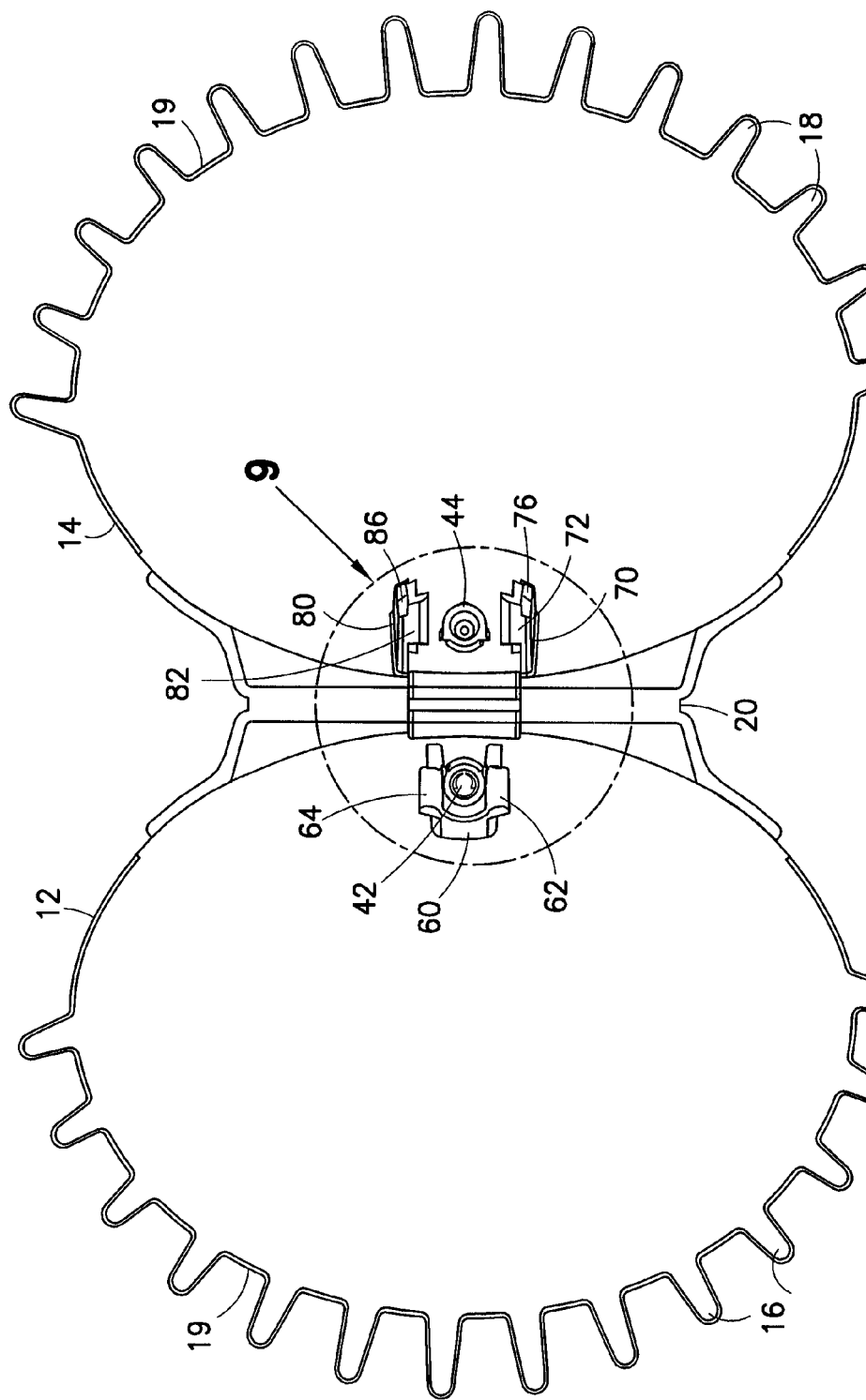
FIG. 8 is an interior view of the bowl-shaped members of the food serving utensil in a pre-assembled position.
Figure 9:
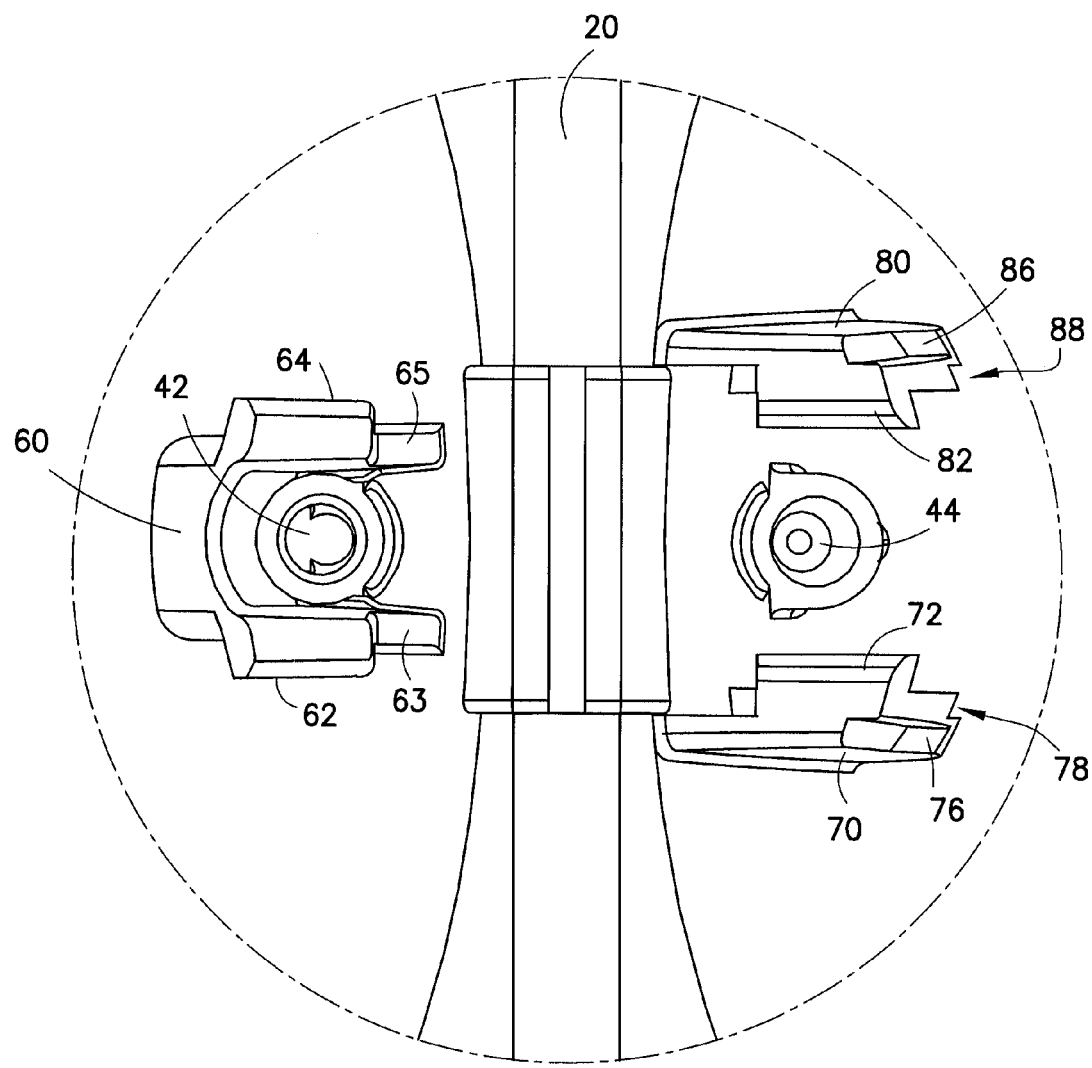
FIG. 9 is an enlarged view of the portion 9 in FIG. 8.

Referring now to FIGS. 7-9, the bowl-shaped members 12, 14 are biased open by the action of the spring 40. In the preferred embodiment, the spring 40 is compressed between a seat 42 and a peg 44 of the bowl-shaped members 12, 14 as the members 12, 14 are rotated closed about the hinge 20. Upon release of the closing force between the seat 42 and the peg 44 on the bowl-shaped members 12, 14, the spring 40 operates to move such members apart. Alternatively or in addition, the hinge 20 may intrinsically bias the bowl-shaped members 12, 14 apart. When the food serving utensil 10 is fully assembled, the bowl-shaped members 12, 14 are constrained to a maximum open angle of preferably less than about ninety degrees (90°), and more preferably about seventy degrees (70°). The maximum open angle is limited by arm structures 60, 70, 80 of the lock 50 as hereinafter described.

Turning now to FIGS. 6-11B, the lock 50 is provided within the open space 11 of the bowl-shaped members 12, 14 adjacent the hinge 20. The lock 50 enables the food serving utensil 10 to assume a compact structure for ease of storage. The lock 50 includes three arm structures 60, 70, 80 preferably thermoformed with the bowl-shaped elements 12, 14 and a sliding latch 90 that operates in coordination with the arms 60, 70, 80 and the spring 40.

Figure 14:
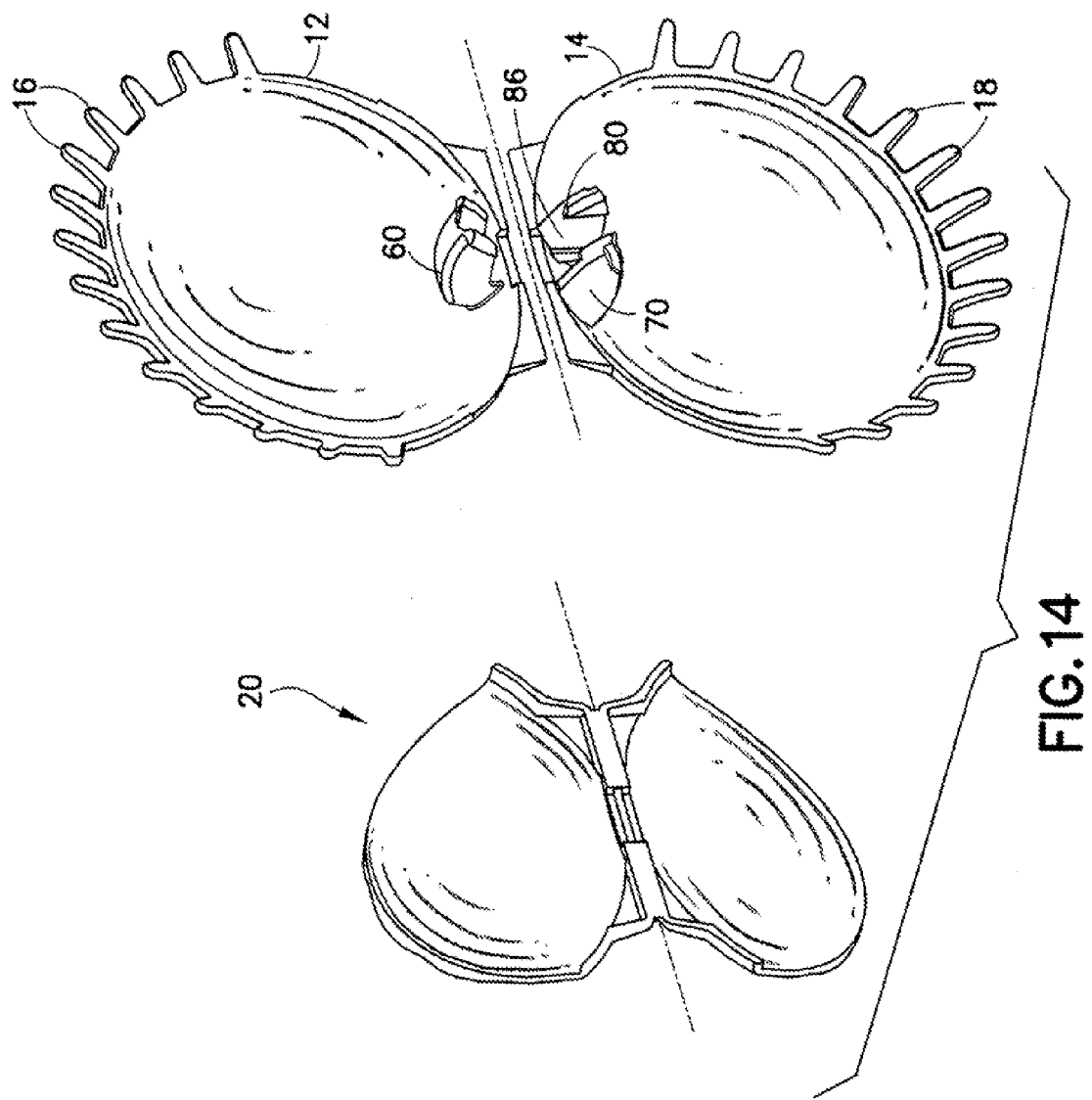
FIG. 14 is an assembly view of the two molded components forming the body of the food serving utensil.

As seen in FIGS. 8, 9, and 14, an inner arm 60 extends from the first bowl-shaped member 12 of the food serving utensil 10 near the hinge 20. The inner arm 60 is arcuate shaped and includes a hollow space in which the spring 40 is provided. The inner arm 60 is attached to the bowl-shaped member 12 at a proximal end and has two separately formed shoulders 62, 64 at a distal end.

A split outer arm structure formed from the two outer arms 70, 80 is joined to the bowl-shaped member 14 at a proximal end near the hinge 20. Each arm 70, 80 extends into the cavity of the utensil 10 at a distal end and includes shoulders 72, 82 respectively. When the inner arm 60 of the bowl-shaped member 12 extends between the outer arms 70, 80, the shoulders 72, 82 provide a structural abutment for the shoulders 62, 64 respectively to thereby limit the maximum angle of rotation of the bowl-shaped members 12, 14 in an open position.

Figure 11:
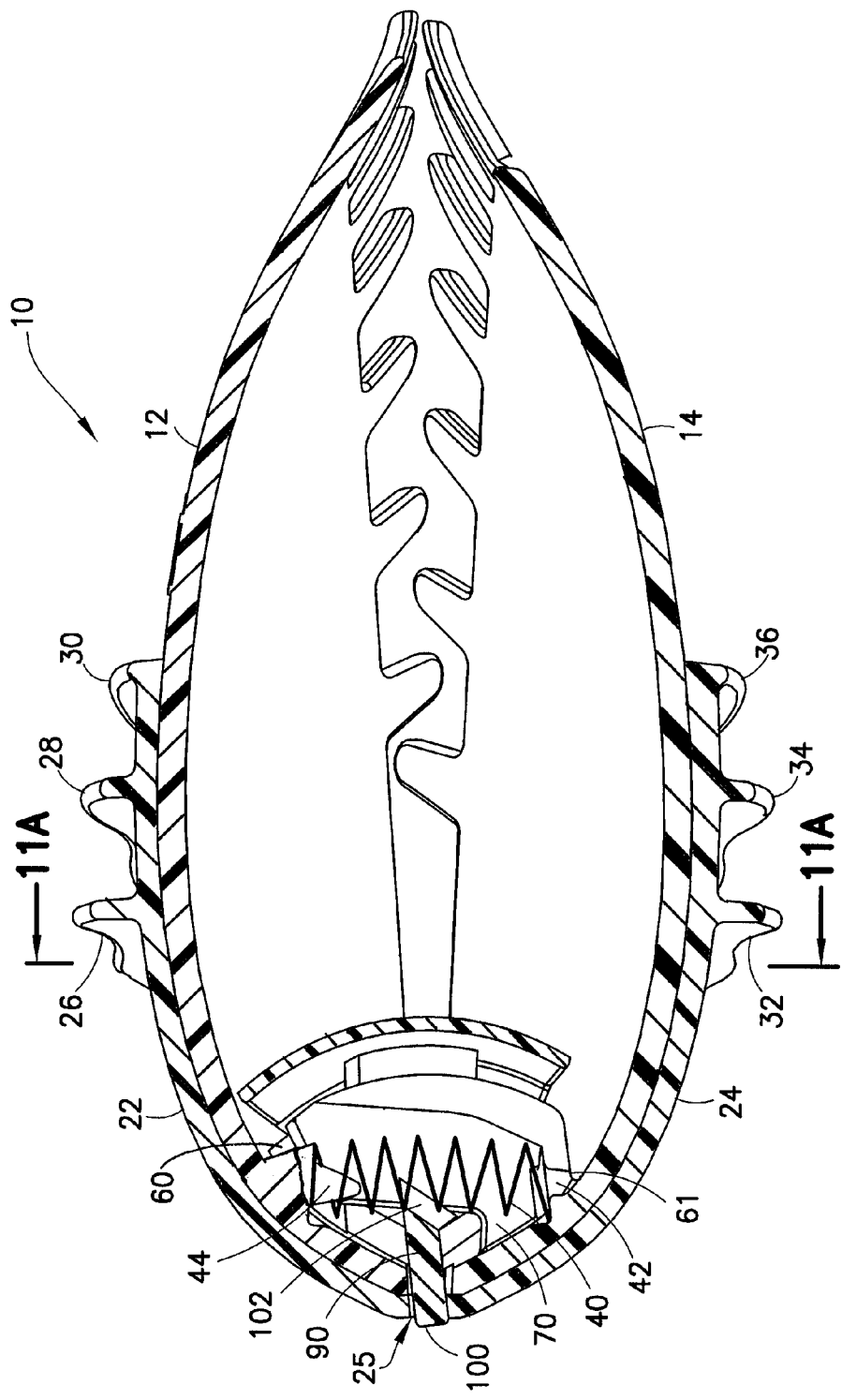
FIG. 11 is a side cross-sectional view of the food serving utensil in a locked position.
Figure 11A:
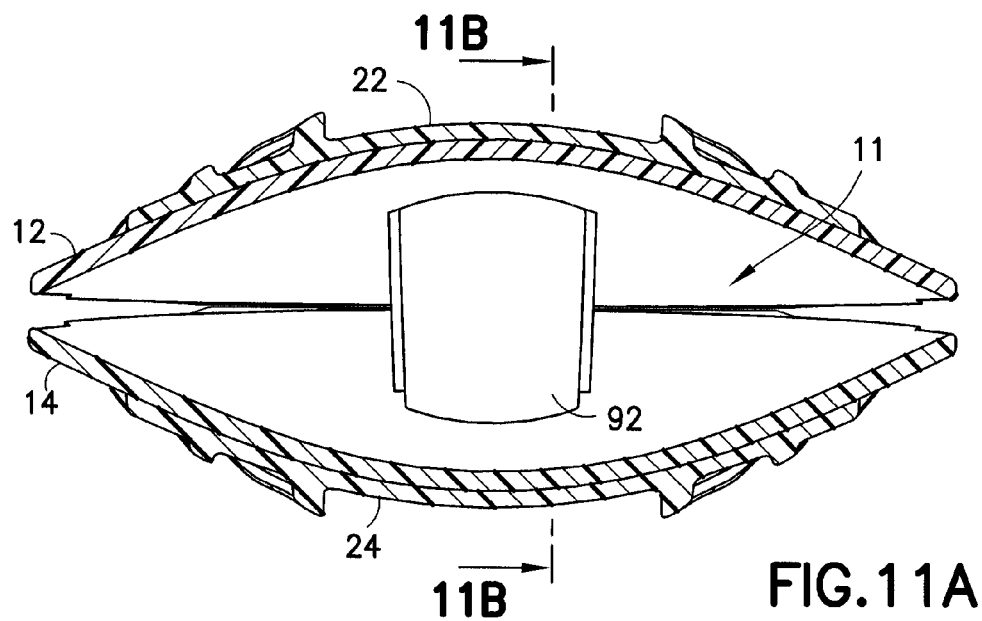
FIG. 11A is a section view across lines 11A-11A in FIG. 11.

As previously discussed, rotation of the bowl-shaped members 12, 14 relative to the hinge 20 is achieved by the biasing of the spring 40 which resides between the inner arm 60 and the two outer arms 70, 80. As seen in FIGS. 7, 11, and 12, the spring 40 is positioned between the seat 42 and the peg 44. The seat 42 is located on the bowl-shaped member 12 within the inner arm 60. The peg 44 is positioned on the bowl-shaped member 14 between the two outer arms 70, 80.

Figure 10:
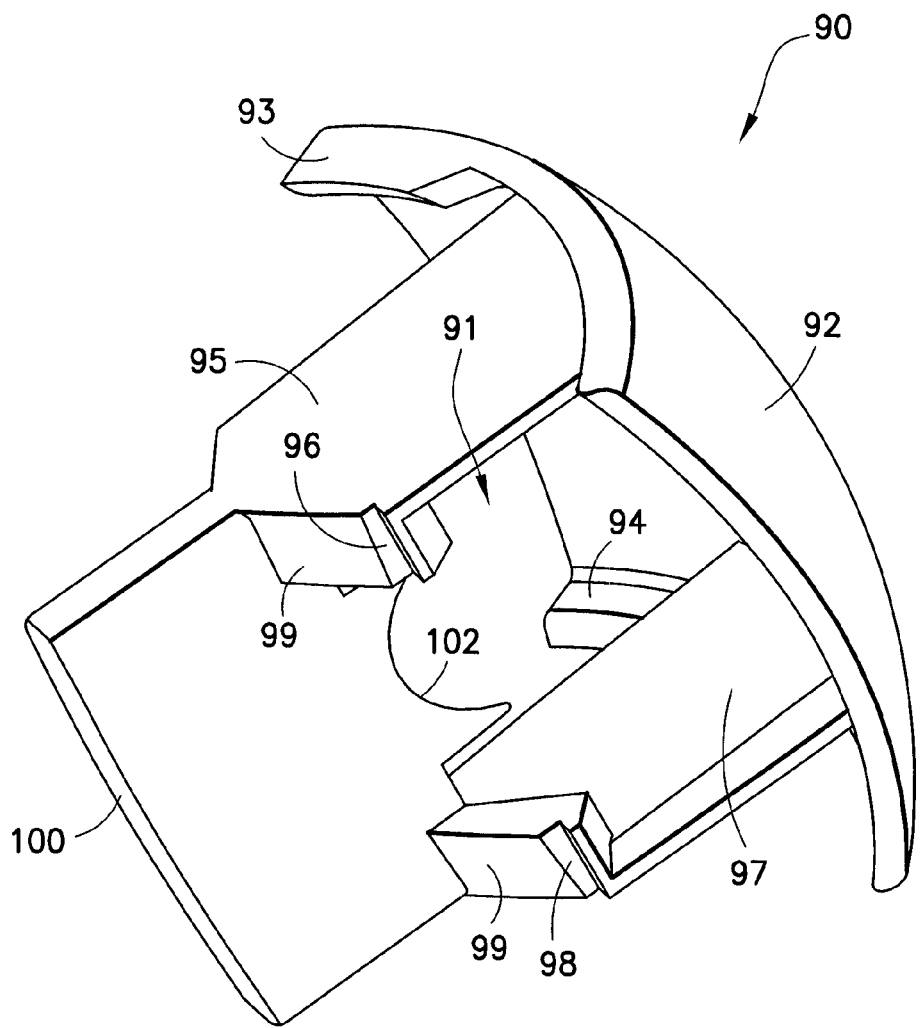
FIG. 10 is a perspective view of the sliding latch.

Referring now to FIGS. 9-10, the outer arms 70, 80 each feature two sets of recesses for the reception of the sliding latch 90. Arm recesses 78, 88 are located on the interior of each outer arm 70, 80 for the reception of the side arms of the sliding latch 90 as illustrated in detail herein afterwards. The arm recesses 78, 88 are referenced in FIG. 9 but are best viewed with reference to FIGS. 14-15. These arm recesses 78, 88 allow the sliding of a structure placed therein in a direction perpendicular to the major lateral dimension of the outer arms 70, 80. In addition, the outer arms 70, 80 include cover recesses 76, 86 for the reception of extensions 93, 94 of a cover 92 of the sliding latch 90 as described in detail hereinafter. The shoulders 62, 64 of the inner arm 60 have catches 63, 65 for mating with notches 96, 98 of the sliding latch 90 as hereinafter described in detail.

Figure 11B:
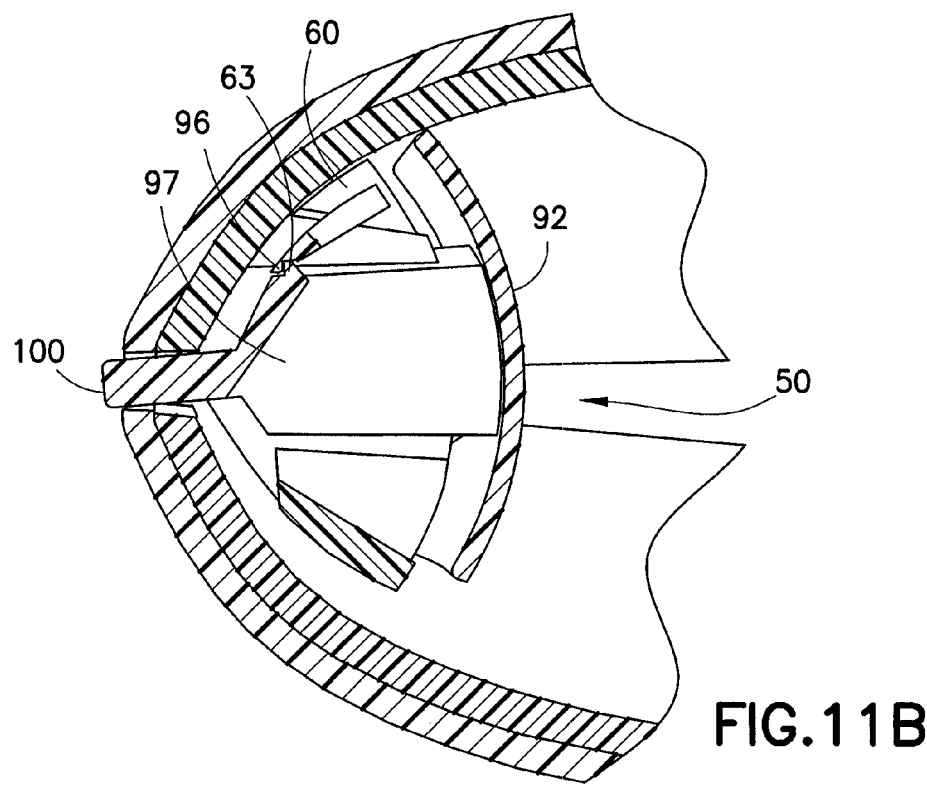
FIG. 11B is a section view across line 11B-11B in FIG. 11A.

Turning now to FIGS. 10-11B, the sliding latch 90 operates in conjunction with the arms 60, 70, and 80 of the food serving utensil 10 to comprise the lock 50. The sliding latch 90 is composed of three sections. The first section is a cover 92 positioned at a front end of the sliding latch 90. The second section is made up of two side arms 95, 97 extending from a rear side of the cover 92. The two side arms 95, 97 connect the cover 92 to the third section which is a tab-like button 100 positioned at the rear of the sliding latch 90. An open space 91 is formed between the cover 92, the side arms 95, 97, and the button 100. The sliding latch 90 is placed between the two outer arms 70, 80 with the button 100 extending backwards through the opening 25 of the hinge 20. The sliding latch 90 permits the arm 60 and the spring 40 to pass between the open space 91 in the sliding latch 90 when the spring 40 is functionally in place between the seat 42 and the peg 44.

The cover 92 primarily protects the lock 50 from the entrance of food that might otherwise contaminate or interfere with the operation of the lock 50. This protective aspect is best seen with reference to FIG. 6. The cover 92 also includes two cover extensions 93, 94 which aid in aligning and securing the sliding piece 90 structurally in place between the two outer arms 70, 80. The cover extensions 93, 94 may slide into the cover recesses 76, 86 of the outer arms 70, 80 respectively to securely affix the cover 92 into position against the outer arms 70, 80.

The side arms 95, 97 of the sliding latch 90 are designed such that they may be slidingly positioned between the arm recesses 78, 88 of the outer arms 70, 80 respectively. The side arms 95, 97 are thereby prevented from undesired rotational movement within the lock 50. Furthermore, the side arms 95, 97 contain notches 96, 98 respectively for the reception of the catches 63, 65 of the shoulder 62 of the inner arm 60. In addition, each side arm 95, 97 has a sloped rear end 99 to smoothly abut the interior surface of the bowl-shaped member 14 when the cover 92 of the sliding latch 90 abuts the outer arms 70, 80 in its rear most position.

The button 100 positioned at the rear of the sliding latch 90 is shown in FIG. 10 as a tab-like piece. As seen in FIG. 11, when the sliding latch 90 is positioned between the outer arms 70, 80, the tab-like button 100 extends through the slot-like opening 25 of the hinge 20 to permit single-handed engagement of the button 100 while the device is being held by the user. The button 100 serves as the primary interface for the user to engage the lock (as described in detail herein afterwards). The button 100 also includes an inwardly directed spring brace surface 102 for the positioning and engagement of the spring 40 during operation of the lock 50.

When the food serving utensil 10 is in an open unlocked position as seen in FIGS. 6-8, the sliding latch 90 resides in a retracted position where it remains flush up against the outer arms 70, 80. In the unlocked position, the inner arm 60 of the lock 50 may freely move through both the open space formed between the outer arms 70, 80 and the opening 91 of the sliding latch 90 as the bowl shaped members 12, 14 are manually rotated towards each other.

The spring 40 assumes multiple configurations as the lock 50 is engaged and disengaged. When the lock is disengaged, the spring 40 freely biases the bowl-shaped members apart toward an open position as best seen in FIG. 7. In this open position, the spring 40 assumes an arcuate shape with a slight bend inward toward the center of the food serving utensil 10. This bend is caused by the relative angular positions of the seat 42 and peg 44. As the bowl-shaped members 12, 14 rotate toward each other into a substantially closed position, the seat 42 and the peg 44 rotate as seen in FIG. 11 to cause the spring 40 to assume a compressed and substantially straightened position. As the bowl-shaped members 12, 14 move into a fully-closed position such that the tines 16, 18 are interlaced as seen in FIG. 12, the seat 42 and the peg 44 move past a parallel arrangement relative to each other causing the spring 40 to from an arcuate shape having a slight bend backwards towards the hinge 20. These positions of the spring 40 assist the engagement and disengagement of the lock 50 as described hereinafter.

The lock 50 is engaged when the bowl-shaped members 12, 14 are rotated into a substantially closed position shown in FIG. 11. From the substantially closed position, the button 100 is advanced into the interior of the utensil 10 by the palm of a hand to lock the bowl-shaped members 12, 14 in a position relative to each other. Alternatively, the button 100 may be pushed by a forefinger as an example while the bowl-shaped members 12, 14 are held substantially closed between the thumb and remaining fingers. The movement of the button 100 causes the sliding latch 90 to move forward resulting in the mating of the catches 63, 65 of the arm 60 with the notches 96, 98 of the sliding latch 90 thereby preventing upward motion of the arm 60 above the newly fixed position. Consequently, the bowl-shaped members 12, 14 are structurally prevented from being biased apart by the spring 40 and in turn assume a locked position. As seen in FIG. 11, pushing the button 100 forward also has the effect of pushing the spring brace surface 102 of the sliding latch 90 against the spring 40 such that the spring 40 assumes a substantially straightened position and remains in contact with the spring brace surface 102.

As seen in FIGS. 11-11B, the described mechanical features of the engaged lock 50 are more clearly illustrated. Referring to FIG. 11, the spring brace surface 102 of the sliding latch 90 maintains contact with the spring 40 when in the locked position. Here, the spring 40 is shown compressed between the seat 42 and the peg 44 in a slightly arcuate position directed toward the hinge 20. Also seen in a second section view in FIG. 11B, the notch 96 of the sliding latch 90 is shown engaging the catch 63 of the inner arm 60.

When in the locked position, the bowl-shaped members 12, 14 are inhibited from opening more than about 15 degrees relative to a line bisecting the two members, i.e. 30 degrees relative to each other. More preferably as seen in FIG. 11, the bowl-shaped members 12, 14 in the locked position are about 5 to 7 degrees apart. When in the locked position the utensil is compact in height (e.g. about 7 cm) for ease of storage.

Turning now to FIGS. 12 and 13, the lock 50 is disengaged by movement of the bowl-shaped members 12, 14 toward each other to a closed or nearly closed position by applying pressure on the bowl-shaped member 12, 14. When forced into the closed position, the seat 42 and the peg 44 are angled slightly backwards toward the hinge 20 as seen in FIG. 12, thereby forcing the spring 40 into an arcuate position in which a slight bend protrudes towards the hinge 20. The movement of the spring 40 into this arcuate position pushes the contacting spring brace surface 102 backwards. This motion of the spring brace surface 102 causes the sliding latch 90 to move backwards so that the notches 96, 98 of the side arms 95, 97 disengage from the catches 63, 65 of the inner arms 60. As a result, the normal bias of the spring 40 becomes unrestricted thereby allowing biasing of the bowl-shaped members 12, 14 to an open position. It is preferred that the bowl shaped members must be pushed together at a specific location in order to effect disengagement of the bowl-shaped members from the locked configuration. This prevents the utensil 10 from inadvertently opening, such as in a drawer. The preferred location is between rib 26 the hinge 20a. This is accomplished by way of the specific geometry incorporated into the locking mechanism and the elastomeric hinge.

Turning now to FIGS. 14-15, the bowl-shaped members 12, 14, the arms 60, 70, 80, and the hinge 20 of the present invention are preferably made by a sequential injection molding process which occurs without removing parts from the molding instrument. In the first injection molding process, the two bowl-shaped members 12, 14 are formed and spaced apart about 1-3 mm. The tines 16, 18, the arms 60, 70, 80, the peg 42, and the seat 44 are also formed with this first injection molding process. The bowl-shaped member 12, 14 and the tines 16, 18 are preferably made from a thermoformable polymeric material such as polypropylene, polycarbonate, polyethylene, polystyrene, ABS, or another suitable material. The bowl-shaped members 12, 14 are then cooled to a sufficiently rigid state so that they do not easily yield to external pressures. The bowl-shaped members 12, 14 are preferably resilient enough that they can withstand repeated cycles of cleaning and drying in a conventional dish washer without deforming.

In accord with the preferred method of the invention, the second injection molding step occurs after the hardening of the bowl-shaped members 12, 14 and without removal of the bowl-shaped members 12, 14 from the shaping mold. A second shaping mold is placed atop the hardened bowls wherein the hinge 20 is formed. More particularly, in operation, at a first station, the hard plastic material is injected into a mold for the bowl-shaped members. The hard plastic material is allowed to harden relative to its injected state. The mold rotates from the first station to a second station, where the second, soft elastomeric material is to be molded. When the mold closes, a second mold geometry is then placed over the existing hard plastic material bowl-shaped member, forming a void where the second material is to be molded over the top of the bowl-shaped members. The elastomeric material is then injected into the void defined between the second mold geometry and the bowl-shape members, and allowed to bond to the first material. The hinge 20 is preferably formed of a second softer polymeric material to produce a different feel and degree of flexibility. The second mold may be used to form only the hinge 20 joining the bowl-shaped member 12 and the bowl-shaped member 14 or an expanded mold may be used to allow the polymer to produce the grips 22, 24 as previously described.

After the bowl-shaped members 12, 14, the arms 60, 70, and 80, and the hinge 20 are molded, these elements are removed from the molding apparatus and assembled with the separately formed spring 40 and sliding latch 90 to form the food serving utensil 10. While the bowl-shaped members 12, 14 are in a fully opened position as best seen in FIG. 15, the sliding latch 90 is first inserted between the arms 70, 80 through the arm recesses 78, 88. A first end of the spring 40 is then inserted through the open space 91 and onto the peg 44. A second end of the spring 40 is then bent and pushed against an inside surface of the arm 60 until the spring 40 rests upon the seat 42. The food serving utensil is then finally completed by compressing the bowl-shaped members 12, 14 together about the hinge 20 against the bias of the spring 40 such that the shoulders 62, 64 of the inner arm 60 snap downward and in between the shoulder 72 of the outer arm 70 and shoulder 82 of the outer arm 80. This final snapping step repositions the shoulders 62, 64 such that the shoulders 62, 64 abut against the shoulders 72, 82 when the spring 40 is allowed to freely bias the bowl-shaped members 12, 14 apart. This resulting abutment prevents the bowl-shaped members 12, 14 from moving apart at angles greater than about ninety degrees and more preferably about 70 degrees.

The polymers used in the molding processes above are selected for physical characteristics desired in the food serving utensil 10. As examples, the hardened bowl-shaped members 12, 14 may be produced by injection molding of polymers such as polyethylene, polypropylene, polycarbonate, polystyrene, or ABS. A person of ordinary skill in the art of polymer chemistry will recognize numerous combinations of polymers to yield desirable physical characteristics in the production of the food serving utensil 10.

There have been described and illustrated herein a food serving utensil and methods of production. While a particular embodiment of the invention has been described, it is not intended that the invention be limited thereto, as it is intended that the invention be as broad in scope as the art will allow and that the specification be read likewise. Thus, while a particular food serving utensil shape and design has been disclosed, it will be appreciated that a variety of other aesthetic designs may be incorporated into the utensil as well. For example and not by way of limitation, the food serving utensil could be shaped in the form of a football, a crab, or a scallop. In addition, while a peg and seat are shown to hold the spring, a wide variety of support structures or platforms could be similarly used. Moreover, while particular dimensions and preferred angles have been disclosed in reference to the food serving utensil presented, it will be appreciated that the utensil may be constructed with other dimensions or adapted to operate with components at other relative angles. Furthermore, while preferred materials have been identified, it will be appreciated that other materials, both polymeric and non-polymeric, including metals and metal alloys, can be used in the construction of the bowl-shaped members, structure coupled thereto, and the hinge. It will therefore be appreciated by those skilled in the art that yet other modifications could be made to the provided invention without deviating from its spirit and scope as claimed.

What is claimed is:

1. A hand-held utensil for serving food, comprising:
   a) a bowl-shaped first member;
   b) a bowl-shaped second member;
   c) a hinge joining said first member and said second member, said first and second members biased to an open position about said hinge; and
   d) a lock which locks said first member and said second member into a locked position in which said first member and said second member are closer together than in said open position, said lock being disengaged by moving said first member and said second member toward each other into a closed position in which said first member and said second member are closer together than in said locked position;
   wherein said hinge is a live hinge.

2. The hand-held utensil of claim 1, wherein:
   at least one of said first member and said second member includes a plurality of tines extending opposite said hinge.

3. The hand-held utensil of claim 1, wherein:
   said live hinge forms a gripping surface including one or more flexible gripping ridges.

4. The hand-held utensil of claim 1, wherein said lock further comprises:
   a) a first arm joined to said first member;
   b) an arm structure joined to said second member; and
   c) a sliding latch including a latch opening, said sliding latch residing within said arm structure, and wherein said first arm is movably engaged within said latch opening between said arm structure.

5. The hand-held utensil of claim 4, wherein:
   said first arm includes one or more shoulders that engage a portion of said arm structure thereby limiting rotation of said first member and said second member about said hinge.

6. The hand-held-utensil of claim 1, wherein:
   said open position, said locked position, and said closed position are defined by an angular position of said first member relative to said second member about said hinge wherein said open position forms an acute angle of about 70 degrees, said locked position forms an acute angle of less than 30 degrees, and said closed position forms an acute angle of less than 3 degrees.

7. The hand-held utensil of claim 1, further comprising:
   said hinge being constructed of a polymeric material.

8. The hand-held utensil of claim 7, wherein:
   said polymeric material includes one of polypropylene, polyethylene, polycarbonate, polystyrene, and ABS.

9. A hand-held utensil for serving food, comprising:
   a) a bowl-shaped first member;
   b) a bowl-shaped second member;
   c) a hinge joining said first member and said second member, said first and second members biased to an open position about said hinge; and
   d) a lock which locks said first member and said second member into a locked position in which said first member and said second member are closer together than in said open position, said lock being disengaged by moving said first member and said second member toward each other into a closed position in which said first member and said second member are closer together than in said locked position, wherein:
   said hinge defines an opening, and said lock comprises a sliding latch extending through said opening in said hinge wherein said sliding latch is engaged to inhibit said bias about said hinge.

10. The hand-held utensil of claim 9, further comprising:
    a spring that biases said first and second members to said open position.

11. The hand-held utensil of claim 10, wherein:
    said spring assumes an arcuate shape and pushes said sliding latch back through said opening when said lock is disengaged.

12. The hand-held utensil of claim 10, wherein:
    said spring resides between a seat of said first member and a peg of said second member,
    wherein said seat and said peg cause said spring to assume an arcuate position in said open position and in said closed position, and
    wherein said seat and said peg cause said spring to assume a substantially straight position in said locked position.

13. The hand-held utensil of claim 9, wherein:
    said hinge is a live hinge.

14. A hand-held utensil for serving food, comprising:
    a) a bowl-shaped first member including a hinged end and a free end;
    b) a bowl-shaped second member including a hinged end and a free end;
    c) a hinge joining said hinged ends of said first and said second bowl-shaped members;
    d) a spring operably coupled to said bowl-shaped members, said spring biasing said first member and said second member to an open position in which said free ends are spaced apart; and
    e) a lock arranged to limit action of said spring such that when said lock is engaged, said spring is prevented from moving said free ends of said first and second members greater than a first distance apart in a locked position, and when said lock is disengaged, said spring acts to bias said free ends apart to a second distance greater than said first distance;
    wherein said hinge is a live hinge.

15. The hand-held utensil of claim 14, wherein:
    said lock is disengaged by moving said first member and said second member toward each other into a substantially closed position.

16. The hand-held utensil of claim 14, wherein:
    said hinge defines an opening, and said lock comprises a sliding latch extending through said opening wherein said sliding latch is engaged to inhibit said bias about said hinge.

17. The hand-held utensil of claim 14, wherein:
    said spring resides between a seat of said first member and a peg of said second member; wherein said seat and said peg cause said spring to assume an arcuate position in said open position; and wherein said seat and said peg cause said spring to assume a substantially straight position in said locked position.

18. The hand-held utensil of claim 14, wherein:
at least one of said first member and said second member includes a plurality of tines extending opposite said hinge.

19. The hand-held utensil of claim 14, wherein:
said live hinge forms a gripping surface including one or more flexible gripping ridges.

20. The hand-held utensil of claim 14, wherein:
said hinge is comprised of a polymeric material, said polymeric material extending over at least a portion of at least one of said first member and second member.

21. The hand-held utensil of claim 14, wherein said lock further comprises:
a) a first arm joined to said first member;
b) an arm structure joined to said second member; and
c) a sliding latch including a latch opening, wherein said sliding latch resides within said arm structure, and wherein said first arm is movably engaged within said latch opening between said arm structure.

22. The hand-held utensil of claim 21, wherein:
said first arm includes one or more shoulders that engage a portion of said arm structure thereby limiting rotation of said first member and said second member about said hinge.

23. The hand-held utensil of claim 14, wherein:
said open position, said locked position, and a closed position are defined by an angular position of said free ends relative to each other about said hinge wherein said open position forms an acute angle of about 70 degrees, said locked position forms an acute angle of less than 30 degrees, and a closed position forms an acute angle of less than 3 degrees.

24. The hand-held utensil of claim 14, further comprising:
said hinge being constructed of a polymeric material.

25. The hand-held utensil of claim 24, wherein:
said polymeric material includes one of polypropylene, polyethylene, polycarbonate, polystyrene, and ABS.

* * * * *